United States Patent
Yoon et al.

(10) Patent No.: US 9,104,920 B2
(45) Date of Patent: Aug. 11, 2015

(54) APPARATUS AND METHOD FOR DETECTING OBSTACLE FOR AROUND VIEW MONITORING SYSTEM

(71) Applicant: Hyundai Motor Company, Seoul (KR)

(72) Inventors: Sung Won Yoon, Gyeonggi-do (KR); Goo Do Kwon, Gyeonggi-do (KR); Hyoung Geun Kwon, Gyeonggi-do (KR); Jin Hyuk Choi, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 367 days.

(21) Appl. No.: 13/693,814

(22) Filed: Dec. 4, 2012

(65) Prior Publication Data
US 2014/0118550 A1    May 1, 2014

(30) Foreign Application Priority Data
Oct. 30, 2012    (KR) .................. 10-2012-0121566

(51) Int. Cl.
| | |
|---|---|
| H04N 7/18 | (2006.01) |
| H04N 5/77 | (2006.01) |
| G06K 9/00 | (2006.01) |
| B60R 1/00 | (2006.01) |
| G08G 1/16 | (2006.01) |

(52) U.S. Cl.
CPC .............. *G06K 9/00805* (2013.01); *B60R 1/00* (2013.01); *G08G 1/163* (2013.01); *B60R 2300/102* (2013.01); *B60R 2300/8093* (2013.01)

(58) Field of Classification Search
CPC ........................................................ H04N 7/18
USPC .......... 348/148; 386/226, 223, 200, 224, 229, 386/248
See application file for complete search history.

(56) References Cited

U.S. PATENT DOCUMENTS

| | | | |
|---|---|---|---|
| 2006/0140447 A1 | 6/2006 | Park et al. | |
| 2010/0085427 A1 | 4/2010 | Cheng et al. | |

FOREIGN PATENT DOCUMENTS

| | | | |
|---|---|---|---|
| CN | 101995239 A | * | 3/2011 |
| JP | 2010-128795 A | | 6/2010 |
| KR | 10-1997-0026444 | | 10/1998 |
| KR | U1999-0026799 | | 7/1999 |
| KR | 10-2006-0075311 | | 7/2006 |

* cited by examiner

*Primary Examiner* — Robert Chevalier
(74) *Attorney, Agent, or Firm* — Mintz Levin Cohn Ferris Glovsky and Popeo, P.C.; Peter F. Corless (57) ABSTRACT

Disclosed herein is an apparatus for detecting an obstacle for an around view monitoring system including a processor configured to store a plurality of images captured through an imaging device, convert a view of the images, generate a plurality of view conversion images corresponding to the images, compare the view conversion images corresponding to a plurality of images captured at a different time interval, extract a plurality of overlapping areas between the view conversion images, calculate a degree of mismatch of the overlapping areas between the view conversion images, detect a mismatch area in the overlapping areas, classify the mismatch area as an obstacle area, and display a position of the obstacle through a display of a vehicle.

12 Claims, 11 Drawing Sheets

APPARATUS AND METHOD FOR DETECTING OBSTACLE FOR AROUND VIEW MONITORING SYSTEM

CROSS-REFERENCES TO RELATED APPLICATIONS

This application claims priority to Korean patent application No. 10-2012-0121566 filed on Oct. 30, 2012, the disclosure of which is hereby incorporated in its entirety by reference.

BACKGROUND OF THE INVENTION

1. Field of the Invention

The present invention relates to an apparatus and a method for detecting an obstacle for an around view monitoring (AVM) system, and more particularly, to an apparatus and a method for detecting an obstacle from an overlapping area by comparing view conversion images of two different points of time acquired through an AVM system and displaying a position of the obstacle.

2. Description of the Related Art

Recently developed methods of recognizing an obstacle around a vehicle include a motion estimation method, an object recognition method, a heterogeneous sensor fusion method, and an imaging device-overlapping area-based method.

The motion estimation method applies complex motion estimation technology such as optical flow using existing image processing, surveillance imaging device and object tracking techniques. The object recognition method recognizes an object using technology such as pattern recognition. The heterogeneous sensor fusion method detects a moving object using an imaging device, detects a fixed obstacle using lidar, a laser scanner, ultrasonic wave, and fuses the detection results to recognize an object. The imaging device overlapping area based method recognizes an object from an image acquired by combining overlapping areas of images captured at the same point in time through a plurality of imaging devices.

for example, a process obtaining optical flow from image data input through an imaging device may be installed in a vehicle during traveling, and may obtain background optical flow generated when the vehicle is traveling, compare a difference between the optical flow and the background optical flow, detect a vehicle area through optical flow for motion of an object around the vehicle obtained from the comparison result, and template match the vehicle area to detect the vehicle.

In addition to the above described methods, various methods are used to recognize an obstacle. However, an operation procedure may be complicated, recognition types may be limited, and manufacturing cost for the system may be increased.

SUMMARY OF THE INVENTION

The present invention provides an apparatus and a method for detecting an obstacle for an around view monitoring (AVM) system by detecting a difference between overlapping areas extracted from view conversion images of two different points of time acquired through an existing AVM system.

The present invention further provides an apparatus and a method for detecting an obstacle, using a broad recognition area of view-conversion images at two different points of time as compared with an imaging device overlapping area-based method. Additionally, the obstacle may be detected Additionally, the apparatus and method may not be limited by a recognition type for recognition of the obstacle.

According to one embodiment of the present invention, an apparatus for detecting an obstacle for an around view monitoring (AVM) system may include a processor within a controller having a memory configured to execute a plurality of units. The units may include: an image conversion unit configured to convert views of images stored in the memory and generate view-conversion images corresponding to the images; an overlapping area extraction unit configured to compare view-conversion images corresponding to two images captured at different points of time and extract overlapping areas between the view-conversion images; a mismatch area detection unit configured to calculate a degree of mismatch of the overlapping areas between the view-conversion images and detect a mismatch area in the overlapping areas; and an obstacle notification unit configured to classify the mismatch area as an obstacle area and display a position of an obstacle through a display of a vehicle.

The overlapping area extraction unit may calculate a displacement between a view conversion image for an image captured at a previous point of time and a view conversion image for an image captured at a current point of time and extract the overlapping areas between the view conversion images.

The mismatch area detection unit may calculate degrees of mismatch in a horizontal direction and a vertical direction with respect to the overlapping areas between the view conversion images and detect mismatch areas in the overlapping areas.

The obstacle notification unit may display the mismatch area with at least one of a color, a contrast, a pattern, and a view different from that of a peripheral area.

The obstacle notification unit may display the position of the obstacle on the image captured at the current point of time or the view conversion image thereof.

According to another aspect of the present invention, a method for detecting an obstacle for an AVM system may include: storing, by a processor, images captured through an imaging device; converting, by the processor, views of the stored images and generating view conversion images corresponding to the stored images; comparing, by the processor, view-conversion images corresponding to two images captured at different points of time and extracting overlapping areas between the view conversion images; calculating, by the processor, a degree of mismatch of the overlapping areas between the view conversion images and detecting a mismatch area in the overlapping areas; and classifying, by the processor, the mismatch area as an obstacle area and displaying a position of an obstacle through a display of a vehicle.

Extracting the overlapping areas may include extracting the overlapping areas between the view conversion images by calculating a displacement between a view conversion image for an image captured at a previous point of time and a view conversion image for an image captured at a current point of time.

Detecting the mismatch area may include detecting mismatch areas in the overlapping areas by calculating degrees of mismatch in a horizontal direction and a vertical direction with respect to the overlapping areas between the view conversion images.

Displaying the position of an obstacle may include displaying the mismatch area with at least one of a color, a contrast, a pattern, and a view different from that of a peripheral area. Additionally, the position of the obstacle on the image captured at the current point of time or the view-conversion image thereof may be displayed.

According to the present invention, an obstacle may be detected from a difference between overlapping areas extracted from view conversion images at two different points of time acquired through an existing AVM system. Further, since the view conversion images at the two different points of time are used, the recognized area may be broader.

The apparatus and methods of the present invention have other features, objects and advantages which will be apparent from or are set forth in more detail in the accompanying drawings, which are incorporated herein, and the following description of exemplary embodiments, which together serve to explain principles of the present invention.

DETAILED DESCRIPTION

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules/units and the processor is specifically configured to execute said modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
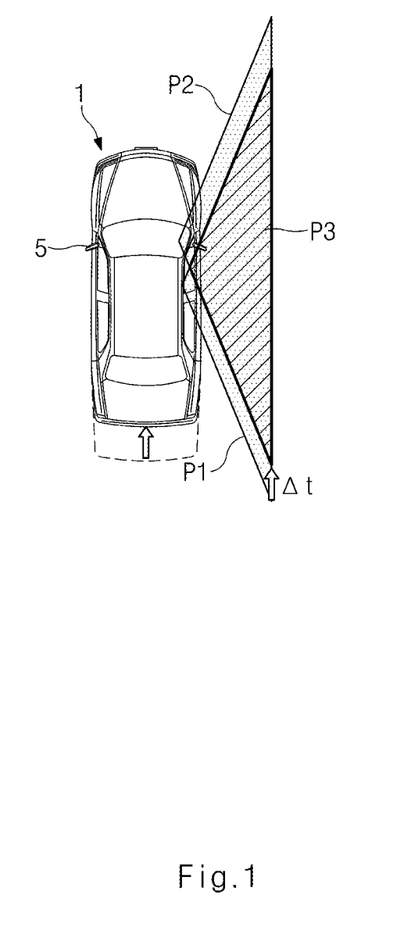
FIG. 1 is an exemplary view illustrating an obstacle detection apparatus for an around view monitoring (AVM) system according to an exemplary embodiment of the present invention.

FIG. 1 is an exemplary view illustrating an obstacle detection apparatus for an around view monitoring (AVM) system according to an exemplary embodiment of the present invention.

An apparatus for detecting an obstacle for an AVM system (hereinafter, referred to as 'obstacle detection apparatus') according to an exemplary embodiment of the present invention may compare overlapping areas of a plurality of images captured at two different points of time in the same direction to classify and display a position of an obstacle. The apparatus may perform an obstacle detection operation when a vehicle is traveling at a low speed or when the vehicle repeatedly stops while traveling.

Referring to FIG. 1, an imaging device 5 disposed on a side of a vehicle 1 may capture a side area P1 (e.g., an imaging device is disposed in the right side in the exemplary embodiment of FIG. 1) while the vehicle is moving. When a predetermined period of time $\Delta t$ has elapsed, the imaging device 5 may capture a side area P2 in the same direction.

Meanwhile, the obstacle detection apparatus may acquire and may store, by a processor, a plurality of images captured through the imaging device 5 (e.g., a camera) in real time. Furthermore, the obstacle detection apparatus compares, by the processor, a captured image of the area P1 captured at a previous point of time, that is, at a point of time t0 with a captured image of the area P2 captured at a subsequent point of time t0 +$\Delta t$ to detect overlapping areas P3 between the captured images and may compare the overlapping areas between the two captured images to detect an obstacle.

The detailed operation of detecting an obstacle in the obstacle detection apparatus will be described with reference to FIG. 2.

Figure 2:
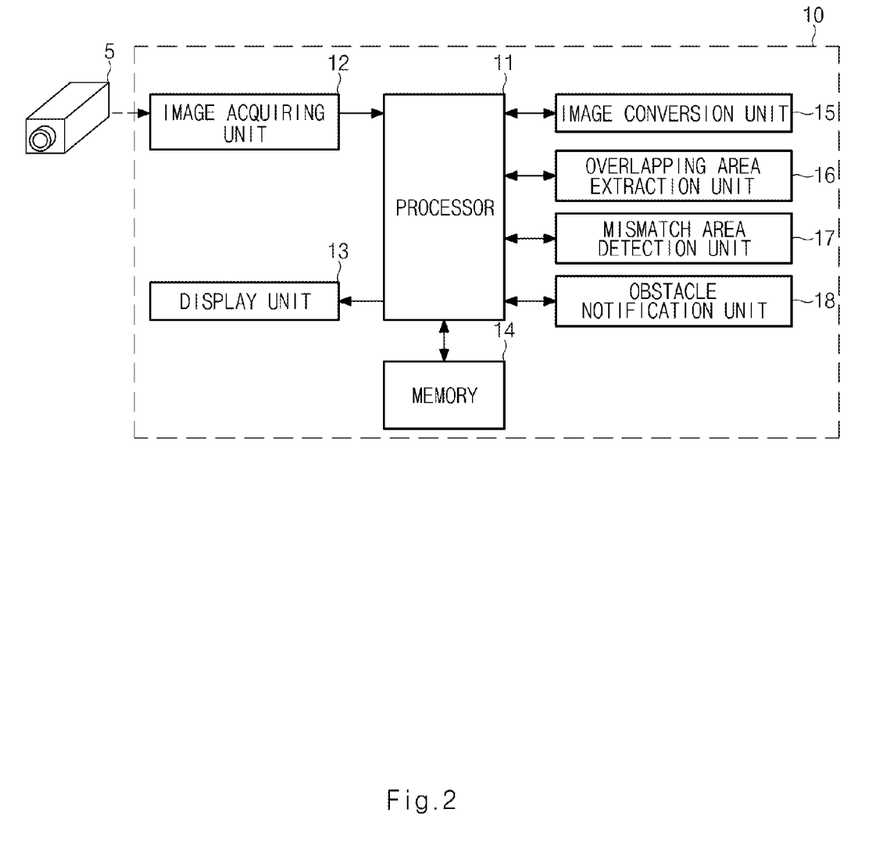
FIG. 2 is an exemplary block diagram illustrating a configuration of an obstacle detection apparatus for an AVM system according to an exemplary embodiment of the present invention.

FIG. 2 is an exemplary block diagram illustrating a configuration of an obstacle detection apparatus for an AVM system according to an exemplary embodiment of the present invention.

Referring to FIG. 2, an obstacle detection apparatus 10 (e.g., a controller) according to the present invention may include a processor 11 and a memory 14. The processor may execute a plurality of units including an image acquiring unit 12, a display unit 13, an image conversion unit 15, an overlapping area extraction unit 16, a mismatch area detection unit 17, and an obstacle notification unit 18.

The image acquiring unit 12 may be connected to the imaging device 5 (e.g., a camera) and may receive an image captured through the imaging device 5. The imaging device may capture an image around a vehicle at different time intervals and images captured through the imaging device may be input through the image acquiring unit 12 and stored in the memory 14.

The image conversion unit 15 may convert, by the processor, a view of an image input through the image input 12 to generate a view conversion image corresponding thereto. The view conversion image generated in the image conversion unit 15 may be stored in the memory 14. Additionally, the memory may store the view conversion image so the image input through the image acquiring unit 12 corresponds to the view conversion image. For example, the memory 14 may store an image captured at a first point of time and a view conversion image corresponding to the image captured at the first point of time and store an image captured at a second point of time and a view conversion image corresponding to the image captured at the second point of time.

The overlapping area extraction unit 16 may compare, by the processor, a view conversion image of an image at a current point of time input through the image acquiring unit 12 with a corresponding view conversion image. At this time, the overlapping area extraction unit 16 may calculate, by the processor, a displacement between the view conversion image of the image captured at the current point of time and the view conversion image of the image captured at the previous point of time to extract overlapping areas between the view conversion images at two different points of time. The detailed embodiment for an operation of extracting the overlapping areas between the view-conversion images at the two different points of time will be described with reference to FIGS. 3 to 6 below.

The mismatch area detection unit 17 may compare, by the processor, a plurality of overlapping areas extracted from view conversions at two different points of time to calculate a degree of mismatch between two overlapping areas. Furthermore, the mismatch area detection area 17 may calculate a degree of mismatch in a horizontal direction and a vertical direction with respect to the two overlapping areas to detect a plurality of mismatch areas in the two overlapping areas. For example, the mismatch area detection unit 17 may compare the two overlapping areas in a plurality of columns to detect the mismatch area in the horizontal direction and may compare the two overlapping areas in a plurality of rows to detect the mismatch area in the vertical direction.

Moreover, the mismatch area detection unit 17 may determine, by the processor, an area in which the degree of mismatch in the horizontal direction or the vertical direction in the overlapping areas is larger than a threshold value, as the mismatch area. For example, the mismatch area detection unit 17 may determine the area in which the degree of mismatch in two overlapping areas in the horizontal direction or the vertical direction is greater than about 50%, as the mismatch area. The detailed embodiment for an operation of detecting the mismatch area will be described with reference to FIGS. 7 and 8.

The obstacle notification unit 18 may classify, by the processor, the mismatch area detected by the mismatch area detection unit 17 as an obstacle area and may display a position of an obstacle through a display of the vehicle.

Furthermore, the obstacle notification unit 18 may display a position of an obstacle on the image captured at the current point of time displayed in the display unit 13 or on the view conversion image thereof. Additionally, the obstacle notification unit 18 may display the mismatch area detected through the mismatch area detection unit 17 with at least one of a color, a contrast, a pattern and a view different from that of a peripheral area.

For example, the obstacle notification unit 18 may display the mismatch area classified as the obstacle area in the image captured at the current point of time with at least one of a color, a contrast, a pattern, and a view different from that of the peripheral area. Alternatively, the obstacle notification unit 18 may display the mismatch area classified as the obstacle area in the view conversion image for the image captured at the current point of time with at least one of a color, a contrast, a pattern, and a view different from that of the peripheral area. Thus, the user may easily recognize a position of the obstacle through the color, contrast, pattern, view, and the like different from a surrounding image. The detailed embodiment of displaying the position of the obstacle will be described with reference to FIG. 9 below.

FIGS. 3 to 6 are exemplary views illustrating an operation of detecting overlapping areas between captured images in the obstacle detection apparatus for the AVM system according to the present invention.

Figure 3:
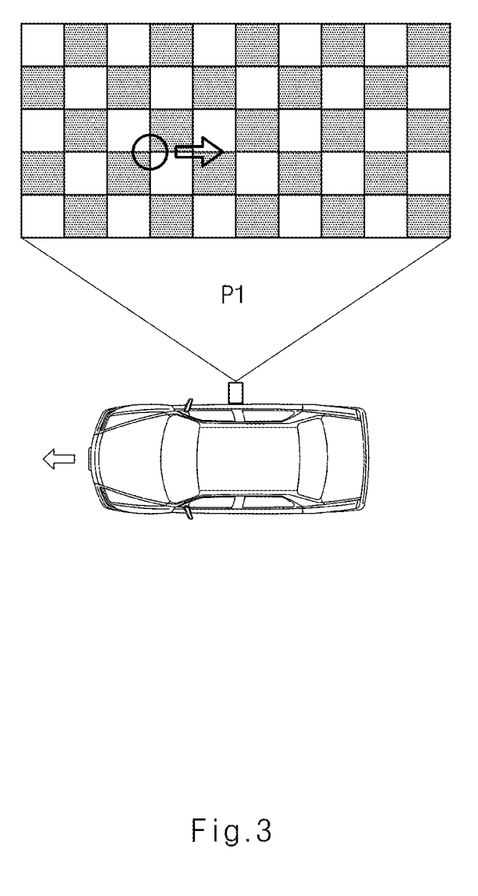
FIGS. 3 to 6 are exemplary views illustrating an operation of detecting overlapping areas between captured images in an obstacle detection apparatus for an AVM system according to an exemplary embodiment of the present invention.

FIG. 3 shows an operation of capturing a side area P1 of a vehicle traveling to the left at a point of time t0.

Figure 4:
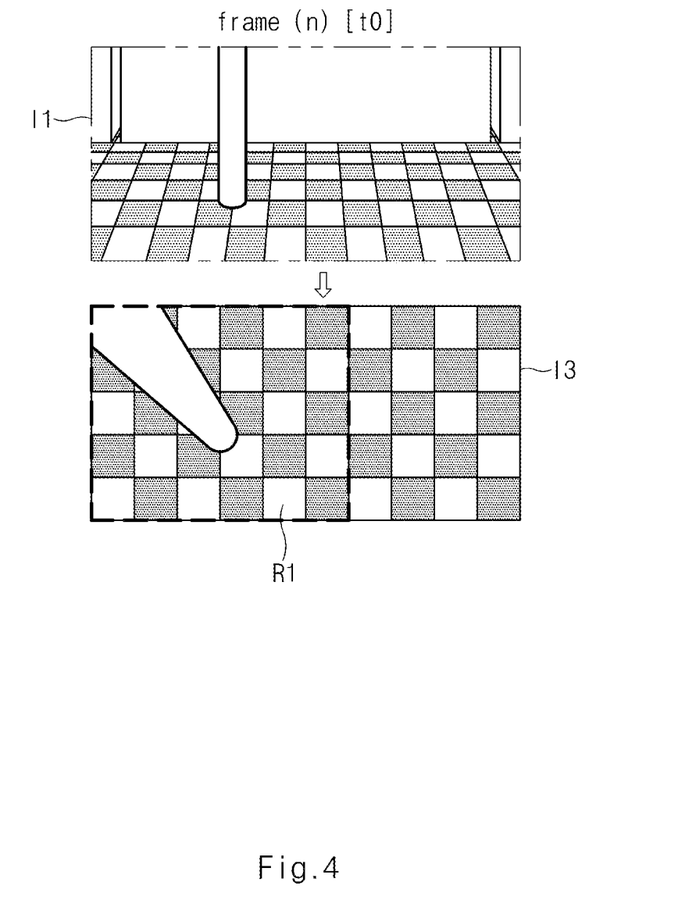

Referring to FIG. 4, when a first image I1 capturing the area P1 at the point of time t0 as shown in FIG. 3 is within an n-th frame, the obstacle detection apparatus may display the first image I1 as 'frame (n) [t0 ]'. When the first image I1 for the area P1 is captured through an imaging device, the obstacle detection apparatus may generate and store a view conversion image I3 in which the captured first image I1 is view converted.

Figure 5:
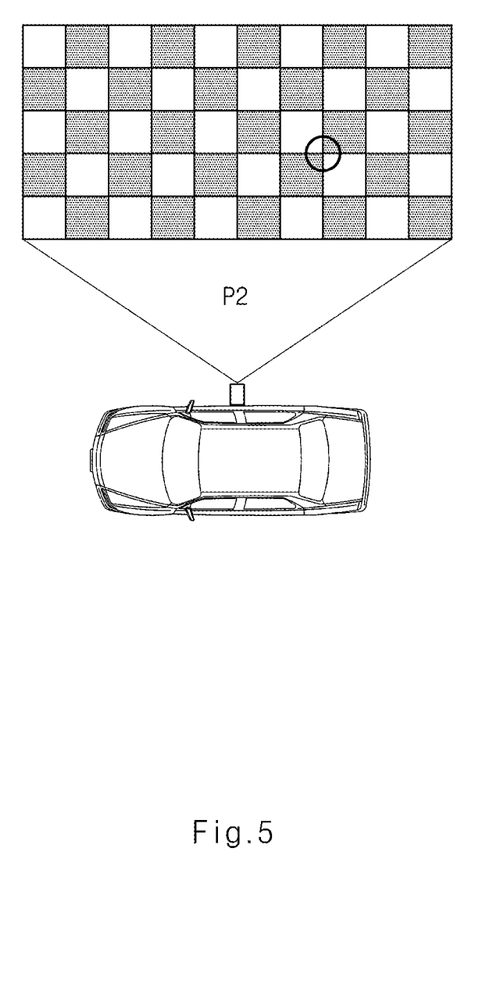

FIG. 5 shows an operation of capturing a side area of the vehicle after a predetermined period of time has elapsed from capturing of the first image in FIG. 3. In other words, when the vehicle is proceeding to the left in FIG. 3 and the predetermined period of time has elapsed, the obstacle detection apparatus may capture a second image of a side area P2 of the vehicle. The captured second image is as shown in FIG. 6.

Figure 6:
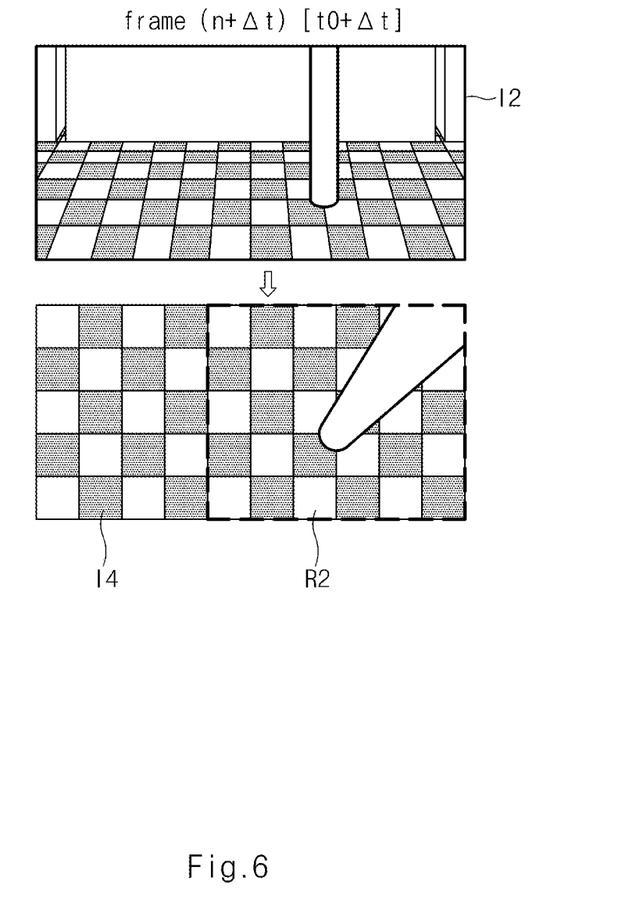

FIG. 6 shows the second image I2 capturing the area P2 when the predetermined period of time $\Delta t$ has elapsed as shown in FIG. 5. In other words, the second image I2 is captured at t0 +$\Delta t$. The obstacle detection apparatus may consider the image I2 as n+$\Delta t$-th frame on the basis of the image I1 of FIG. 4. Furthermore, the image I2 may be displayed as 'frame (n+$\Delta t$) [t0 +$\Delta t$]'. When the image I2 for the area P2 is captured through the imaging device, the obstacle detection apparatus may generate and store a view conversion image I4 in which the captured image I2 is view converted.

Moreover, the obstacle detection apparatus may calculate, by the processor, a displacement between the view conversion image Ib3 of FIG. 4 and the view conversion image I4 of FIG. 6 to extract overlapping areas R1 and R2 between two view conversion images. Subsequently, the obstacle detection apparatus may compare a degree of mismatch between the two overlapping areas R1 and R2 and classify an area in which the degree of mismatch is over a threshold value, as an obstacle area.

Figure 7:
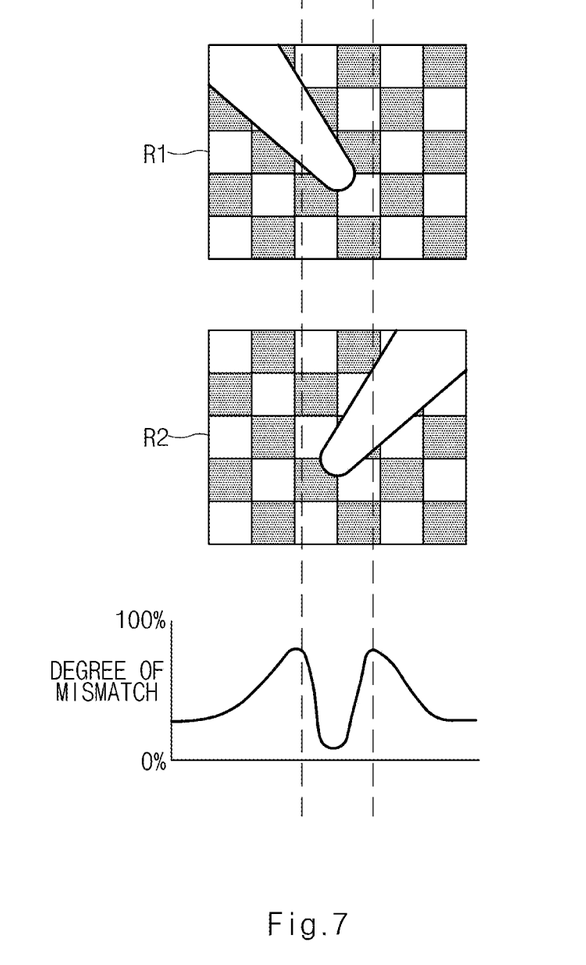
FIGS. 7 and 8 are exemplary views illustrating an operation of detecting a mismatch area between overlapping areas in an obstacle detection apparatus for an AVM system according to an exemplary embodiment of the present invention.
Figure 8:
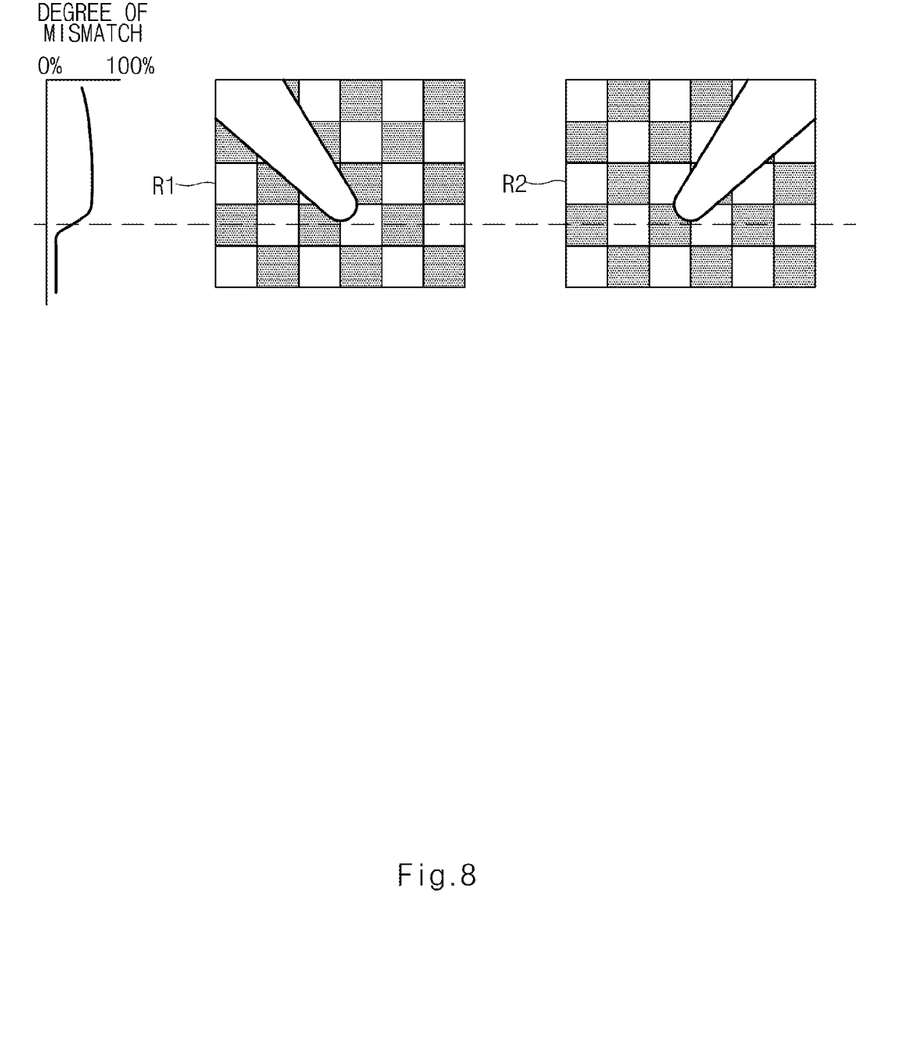

FIGS. 7 and 8 are exemplary views illustrating an operation of detecting a mismatch area between overlapping areas in the obstacle detection apparatus for the AVM system according to the present invention.

FIG. 7 shows an operation of calculating, by the processor, a degree of mismatch between the two overlapping areas R1 and R2 extracted in FIGS. 4 and 6 in a horizontal direction.

Referring to FIG. 7, the obstacle detection apparatus may compare, by the processor, corresponding columns of the two overlapping areas R1 and R2 to calculate the degree of mismatch of the corresponding column. In the two overlapping areas R1 and R2 illustrated in FIG. 7, six blocks form six columns and the obstacle detection apparatus may compare the two overlapping areas R1 and R2 within the six columns to calculate the degree of mismatch in the horizontal direction.

A graph illustrated in FIG. 7 shows the calculated degree of mismatch between the two overlapped images. Since the degree of mismatch is highest between the second and third columns and between the fourth and fifth columns as shown from the graph, the obstacle detection apparatus may determine an area including the third and fourth columns as the mismatch area. Furthermore, the center of the obstacle may be positioned between the third and fourth columns and the obstacles may overlap and thus, the degree of mismatch becomes relatively low.

Referring to FIG. 8, the obstacle detection apparatus may compare, by the processor, corresponding rows of the two overlapping areas R1 and R2 extracted in FIGS. 4 and 6 to calculate the degree of mismatch of the corresponding row. In the two overlapping areas R1 and R2 illustrated in FIG. 8, five blocks form five rows and the obstacle detection apparatus may compare the two overlapping areas R1 and R2 within the five rows to calculate the degree of mismatch in the vertical direction.

A graph illustrated in FIG. 8 shows the calculated degree of mismatch between the two overlapped images. The graph shows that the degree of mismatch is high from the first row to the fourth row and the degree of mismatch is low in the subsequent rows. Therefore, the obstacle detection apparatus may determine an area including the first to fourth rows as the mismatch area.

Additionally, the obstacle detection apparatus may combine, by the processor, the mismatch area of the horizontal direction detected in FIG. 7 and the mismatch area of the vertical direction detected in FIG. 8 to determine an obstacle area.

Figure 9:
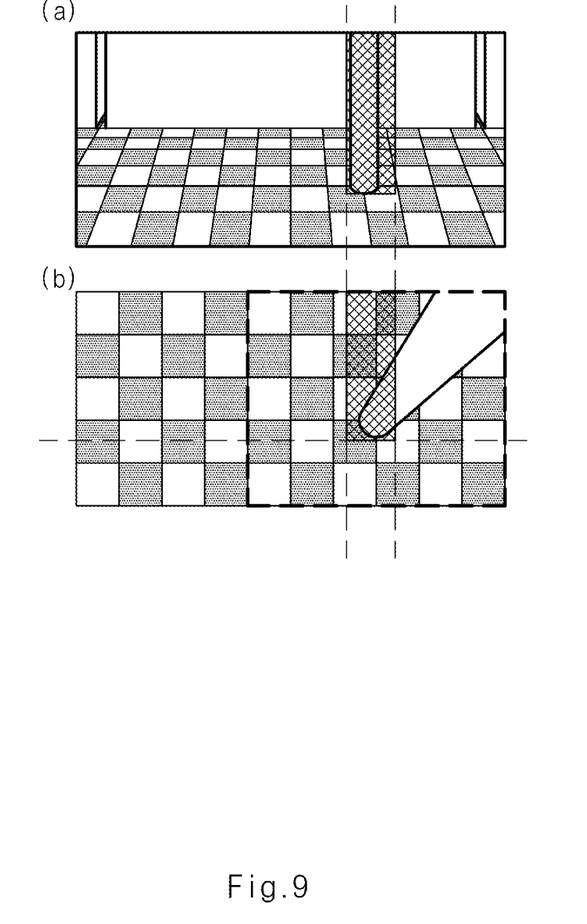
FIG. 9 is an exemplary view illustrating an operation of displaying an obstacle area in an obstacle detection apparatus for an AVM system according to an exemplary embodiment of the present invention.

FIG. 9 is an exemplary view illustrating an operation of displaying an obstacle area in the obstacle detection apparatus for the AVM system according to the present invention.

Referring to FIG. 9, the obstacle detection apparatus may display the obstacle area detected in FIGS. 7 and 8 through an image acquired at a current point of time or a corresponding view conversion image. FIG. 9(a) shows an obstacle area displayed on the image acquired at the current point of time. The obstacle area may be displayed by at least one of a color, a contrast, a pattern, a view different from that of a peripheral area to distinguish from the peripheral area. Moreover, FIG. 9(b) shows the obstacle area on the acquired view conversion image. Similar to FIG. 9(a), the obstacle area may be displayed by at least one of a color, a contrast, a pattern, a view different from that of a peripheral area to distinguish from the peripheral area. Thus, the user may easily recognize the area in which the obstacle is located in the acquired image or the view conversion image.

A method of the obstacle detection apparatus for the AVM system having the configuration according to the present invention will be described in detail.

Figure 10:
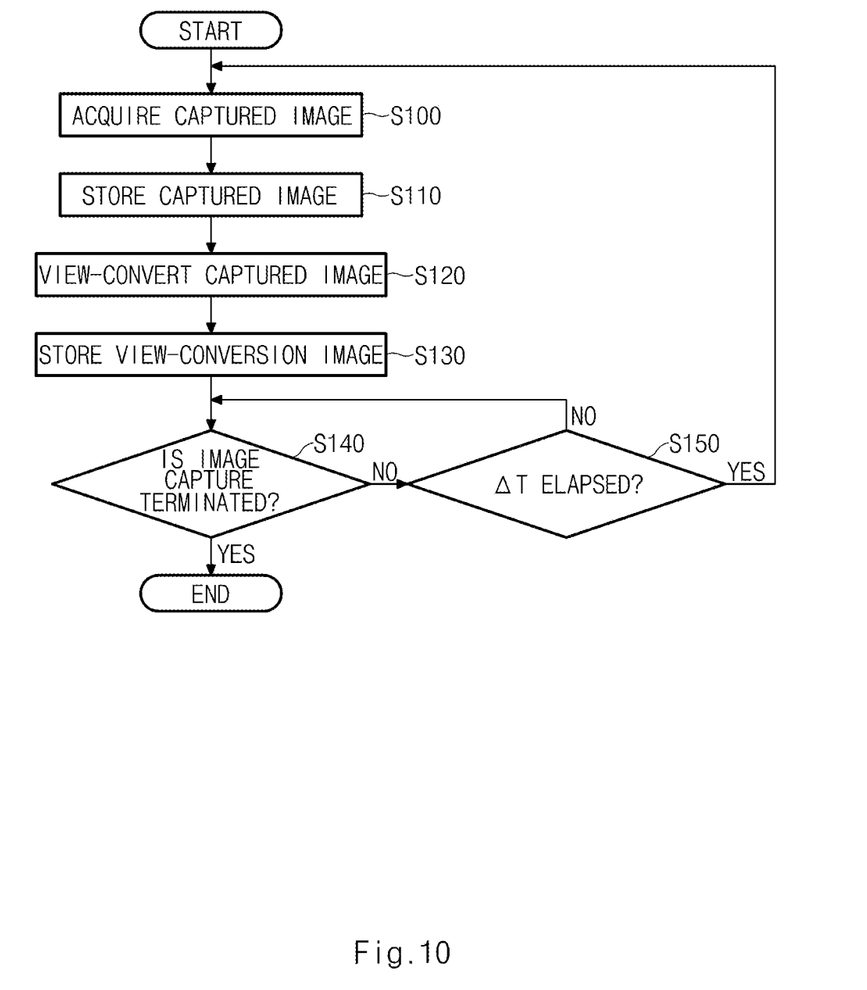
FIGS. 10 and 11 are exemplary flowcharts illustrating an obstacle detection method in an obstacle detection apparatus for an AVM system according to an exemplary embodiment of the present invention.
Figure 11:
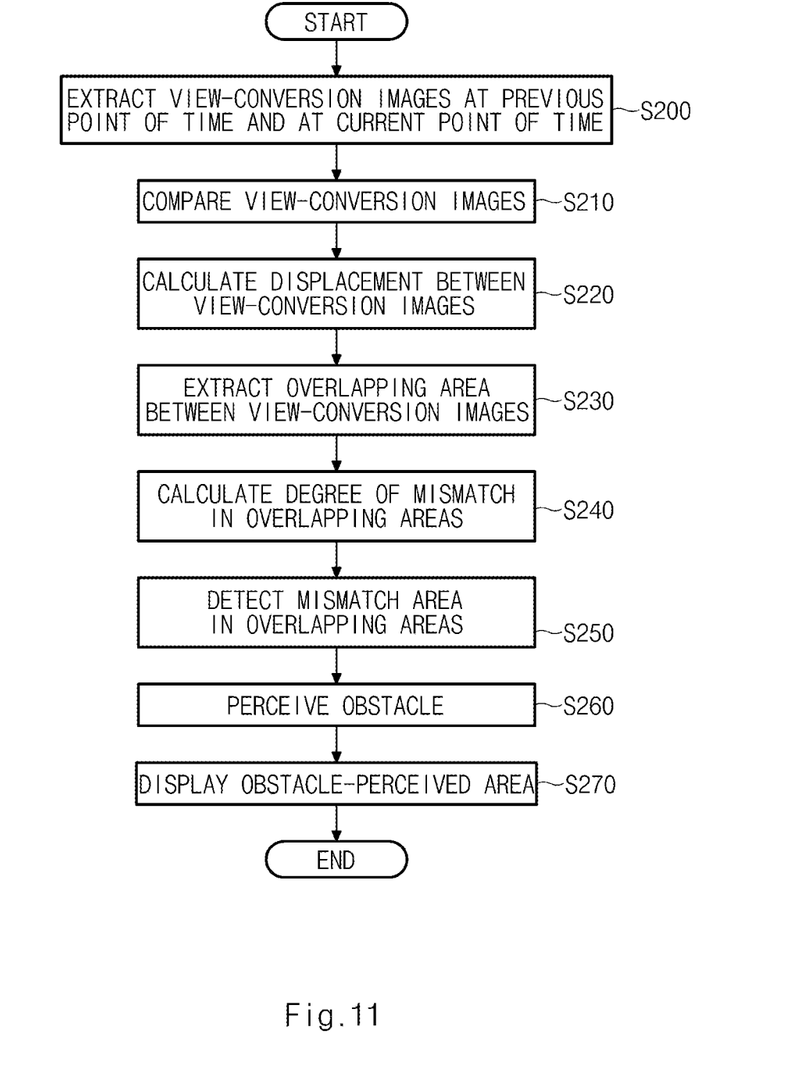

FIGS. 10 and 11 are exemplary flowcharts illustrating a detecting an obstacle for an AVM system according to the present invention.

FIG. 10 illustrates a method of view conversion for an acquired image.

Referring to FIG. 10, the obstacle detection apparatus may acquire, by a processor, a captured image at a current point of time captured through an imaging device (S100), and may store the acquired current image (S110) in a memory. Furthermore, the obstacle detection apparatus may convert, by the processor, the view of the captured current image acquired in step S100 (S120) and may store the view conversion image in step S120 with the captured image (S130).

When a predetermined period of time has elapsed, the obstacle detection apparatus may acquire a captured subsequent image at a subsequent point of time (S100) and may store the acquired subsequent image and a view conversion image. This process may be repeated a predetermined intervals of time (S110 to S130).

As described above, the obstacle detection apparatus may repeatedly performs steps S100 to S150 before the image capture termination command is input and may continuously store a captured image at a corresponding point of time and a corresponding view conversion image when the predetermined period of time has elapsed. When the image capture termination command is input (S140), the corresponding operation may be terminated.

FIG. 11 illustrates a method of detecting an obstacle through the view conversion image generated in FIG. 10.

Referring to FIG. 11, the obstacle detection apparatus may extract, by the processor, a first view conversion image at the previous point of time stored in step S130 of FIG. 10 and a second view conversion image at the current point of view (S200) and may compare the first view conversion image with the second view conversion image extracted in step 200 (S210).

Furthermore, the obstacle detection apparatus may calculate, by the processor, a displacement between the first view conversion image and the view conversion second image (S220), extract overlapping areas between the first view conversion image and the view conversion second image (S230), and compare the overlapping areas extracted in step S230 to calculate a degree of mismatch (S240). The obstacle detection apparatus may detect a mismatch area in the overlapping areas based on the degree of mismatch calculated in step S240.

For example, the obstacle detection apparatus may compare the first view conversion image and the second view conversion image in a horizontal direction and a vertical direction to calculate the degree of mismatch in the horizontal direction and the vertical direction and may detect a plurality of mismatch areas in the horizontal direction and the vertical direction.

Thus, the obstacle detection apparatus may classify, by the processor, an obstacle from the mismatch area detected in step S250 (S260). Furthermore, the obstacle detection apparatus may combine the mismatch area in the horizontal direction and the mismatch area in the vertical direction to classify an overlapping area as an obstacle area.

Subsequently, the obstacle detection apparatus may display, by the processor, the obstacle classified area on the image captured at the current point of time or the corresponding view conversion image for the user to recognize a position of the obstacle (S270). Further, the obstacle detection apparatus may display the obstacle classified area with at least one of a color, a contrast, a pattern, and a view different from that of a peripheral area to distinguish from the peripheral area.

The foregoing descriptions of exemplary embodiments of the present invention have been presented for purposes of illustration and description. They are not intended to be exhaustive or to limit the invention to the precise forms disclosed, and many modifications and variations are possible in light of the above teachings. The exemplary embodiments were chosen and described to explain principles of the invention and their practical application, to thereby enable others skilled in the art to make and utilize exemplary embodiments of the present invention, as well as various alternatives and modifications thereof. It is intended that the scope of the invention be defined by the accompanying claims and their equivalents.

What is claimed is:

1. An apparatus for detecting an obstacle for an around view monitoring system, the apparatus comprising:
    a processor configured to:
    store a plurality of images captured through an imaging device;
    convert a view of the plurality of images;
    generate a plurality of view conversion images corresponding to the plurality of images;
    compare the plurality of view conversion images corresponding to the plurality of images captured at a different time interval;
    extract a plurality of overlapping areas between the plurality of view conversion images;
    calculate a degree of mismatch in a horizontal direction and a vertical direction with respect to the plurality of overlapping areas between a first view conversion image for an image captured at a previous point of time and a second view conversion image for an image captured at a current point of time;
    detect a mismatch area in each overlapping area;
    classify the mismatch area as an obstacle area; and
    display a position of the obstacle on a display of a vehicle.

2. The apparatus of claim 1, wherein the processor is further configured to:
    calculate a displacement between the first view conversion image and the second view conversion image; and
    extract the plurality of overlapping areas between the first and the second view conversion image.

3. The apparatus of claim 1, wherein the processor is configured to display the mismatch area using at least one selected from a group consisting of: a color, a contrast, a pattern, and a view different from a peripheral area.

4. The apparatus of claim 1, wherein the processor is further configured to display the position of the obstacle on the image captured at the current point of time or a corresponding view conversion image thereof.

5. A method for detecting an obstacle for an around view monitoring system, the method comprising:
    storing, by a processor, a plurality of images captured through an imaging device;
    converting, by the processor, a view of the plurality of images;
    generating, by the processor, a plurality of view conversion images corresponding to the plurality of images;
    comparing, by the processor, the plurality of view conversion images corresponding to the plurality of images captured at a different time interval;
    extracting, by the processor, a plurality of overlapping areas between the plurality of view conversion images;
    calculating, by the processor, a degree of mismatch in a horizontal direction and a vertical direction with respect to the plurality of overlapping areas between a first view conversion image for an image captured at a previous point of time and a second view conversion image for an image captured at a current point of time;
    detecting, by the processor, a mismatch area in each overlapping area;
    classifying, by the processor, the mismatch area as an obstacle area; and
    displaying, by the processor, a position of the obstacle on a display of a vehicle.

6. The method of claim 5, wherein extracting the plurality of overlapping areas further calculating, by the processor, a displacement between the first view conversion image and the second view conversion image.

7. The method of claim 5, wherein displaying the position of the obstacle includes displaying, by the processor, the mismatch area use at least one of a group consisting of: a color, a contrast, a pattern, and a view different from a peripheral area.

8. The method of claim 5, wherein displaying the position of the obstacle further includes displaying, by the processor, the position of the obstacle on the image captured at the current point of time or a corresponding view-conversion image.

9. A non-transitory computer readable medium containing program instructions executed by a processor or controller, the computer readable medium comprising:
    program instructions that store a plurality of images captured through an imaging device;
    program instructions that convert a view of the plurality of images;
    program instructions that generate a plurality of view conversion images corresponding to the plurality of images;
    program instructions that compare the plurality of view conversion images corresponding to the plurality of images captured at a different time interval;
    program instructions that extract a plurality of overlapping areas between the plurality of view conversion images;
    program instructions that calculate a degree of mismatch in a horizontal direction and a vertical direction with respect to the plurality of overlapping areas between a first view conversion image for an image captured at a previous point of time and a second view conversion image for an image captured at a current point of time;
    program instructions that detect a mismatch area in each overlapping area;
    program instructions that classify the mismatch area as an obstacle area; and
    program instructions that display a position of the obstacle on a display of a vehicle.

10. The computer readable medium of claim 9, further comprising:
    program instructions that calculate a displacement between the first view conversion image and the second view conversion image; and
    program instructions that extract the plurality of overlapping areas between the first and the second view conversion image.

11. The computer readable medium of claim 9, further comprising program instructions that display the mismatch area using at least one selected from a group consisting of: a color, a contrast, a pattern, and a view different from a peripheral area.

12. The computer readable medium of claim 9, further comprising program instructions that display the position of the obstacle on the image captured at the current point of time or a corresponding view conversion image thereof.

* * * * *